United States Patent [19]

Shuker

[11] Patent Number: 5,118,232
[45] Date of Patent: Jun. 2, 1992

[54] QUICK TIE

[76] Inventor: Cary W. Shuker, 7145 Goodview Ave., Riverside, Calif. 92504

[21] Appl. No.: 486,012

[22] Filed: Feb. 26, 1990

Related U.S. Application Data

[63] Continuation-in-part of Ser. No. 904,895, Sep. 8, 1986, abandoned.

[51] Int. Cl.⁵ .............................................. B61D 45/00
[52] U.S. Cl. .................................... 410/98; 410/100; 410/34
[58] Field of Search ............... 410/96, 97, 98, 100, 410/103, 120, 34, 12

[56] References Cited

U.S. PATENT DOCUMENTS

| | | | |
|---|---|---|---|
| 804,863 | 11/1905 | Kempton | 410/34 |
| 2,449,600 | 9/1948 | Geiger | 410/100 |
| 2,713,499 | 7/1955 | Wagner | 410/100 |
| 2,768,004 | 10/1956 | Wagner | 410/100 |
| 2,919,895 | 1/1960 | Johnson | 410/103 |
| 3,240,473 | 3/1966 | Coffey et al. | 410/103 |
| 4,382,736 | 5/1983 | Thomas | 410/100 |
| 4,428,099 | 1/1984 | Richmond | 410/100 X |
| 4,884,928 | 12/1989 | Nachtigall et al. | 410/100 X |
| 4,900,203 | 2/1990 | Pope | 410/100 X |

FOREIGN PATENT DOCUMENTS 163418  10/1905  Fed. Rep. of Germany ...... 410/100

Primary Examiner—Robert J. Spar
Assistant Examiner—William M. Hienz
Attorney, Agent, or Firm—Lyon & Lyon

[57] ABSTRACT

A quick tie load binding system for securing loads to trucks or vehicles having a flat bed surface by uniformly pulling the binding which holds the load to the flat-bed surface. The load is secured to the vehicle by a binding which is connected to main shafts that run along opposite sides of the load and which are driven in a counter-rotational fashion from a gear box. The main shafts have binding pegs projecting outward to which the binding is attached. The gear box rotates the main shafts in opposite directions to bind or release the entire load from a single location.

10 Claims, 3 Drawing Sheets

QUICK TIE

RELATED APPLICATION DATA

This application is a continuation-in-part of application Ser. No. 06/904,895 filed on Sep. 8, 1986 by the same inventor, now abandoned.

BACKGROUND OF THE INVENTION

The field of the present invention is load binding systems for flat bed vehicles.

Conventional load binding systems, wherein several spaced-apart ropes or straps are individually tightened, require far too much time to secure a load to the vehicle. These conventional systems require the operator to fasten the load securing ropes or straps to each side of his vehicle using a series of knots or "come-along" tightening devices. The load may shift because unequal tension is applied when the operator only initially secures one side. This conventional system is not only time-consuming, but unreliable, and can could lead to catastrophic consequences should the system fail while the vehicle is travelling on the highway. Also, time is wasted unloading the vehicle because each of these knots must be released to remove the cargo. Therefore, a need has arisen for a more economical and safe load binding system.

SUMMARY OF THE INVENTION

This present invention provides a system for securing loads to vehicles that saves time when tieing or loosening the securing ropes or strapping means which hold a load on a flat bed vehicle, and that provides a safer and more efficient way for doing so.

The system utilizes a pair of rotating shafts, having a number of binding pegs extending outwardly thereform, attached to the truck side below the flat bed deck. Preferably, one such shaft will be used on each side of the truck. A single length of rope or other strapping material is attached at distal ends of the shaft or shafts, criss-crossing the load to be secured, and threaded onto intermediate binding pegs, and pulled hand-taut. The shaft or shafts are rotated, pulling the rope tight substantially equally and simultaneously at all points along the load.

This system has a remarkable holding effect on any load. By pulling with equal pressure on all bindings at the same time from both sides of a load, it is secured tightly to the vehicle. Not only does the present invention provide a fast way to secure a load, it is extremely easy to untie the entire load from a single point. Unbinding a load secured by conventional systems may take up to half an hour or more however, the unbinding with this invention can be done in seconds.

The present invention is particularly suited to be used by the trucking industry. Truckers commonly use a series of ropes to secure loads to their flatbed trucks by multiple cumbersome and unreliable truckers' hitches and knots. However, the Quick Tie System needs only two knots at most and secures a load with approximately one-third less rope, which alone could save thousands of dollars for a large trucking company.

Accordingly, it is an object of the present invention to provide an economical and efficient binding system for vehicles. Other and further objects and advantages will appear hereinafter.

DETAILED DESCRIPTION OF THE PREFERRED EMBODIMENT

Figure 1:
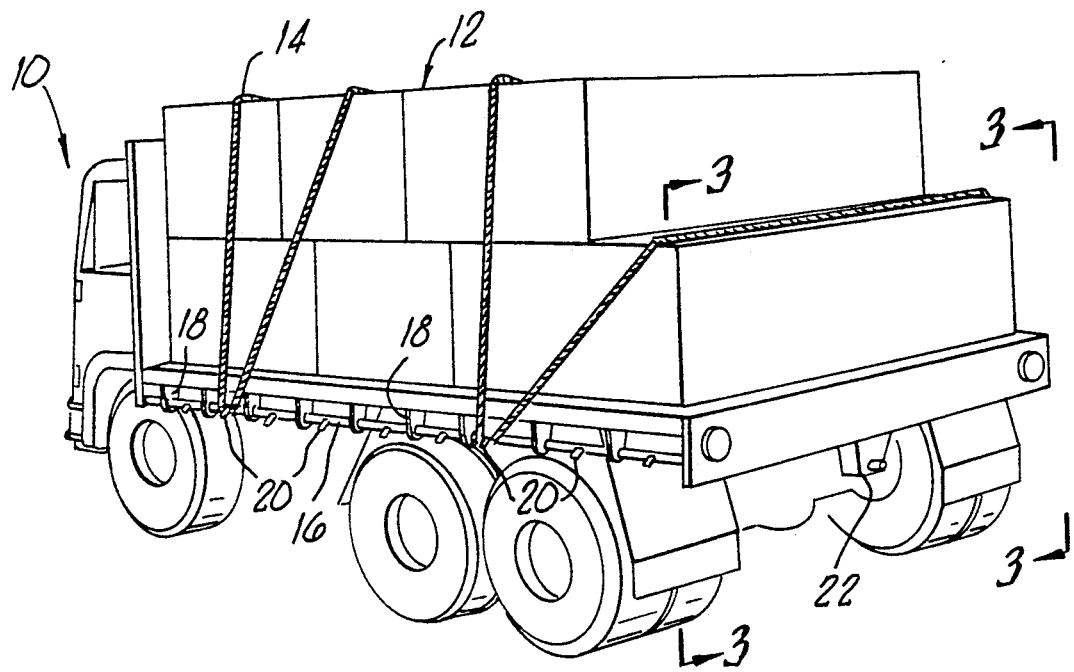
FIG. 1 is a perspective three quarter rear view of a loaded flat bed vehicle with Quick Tie System of the present invention.
Figure 2:
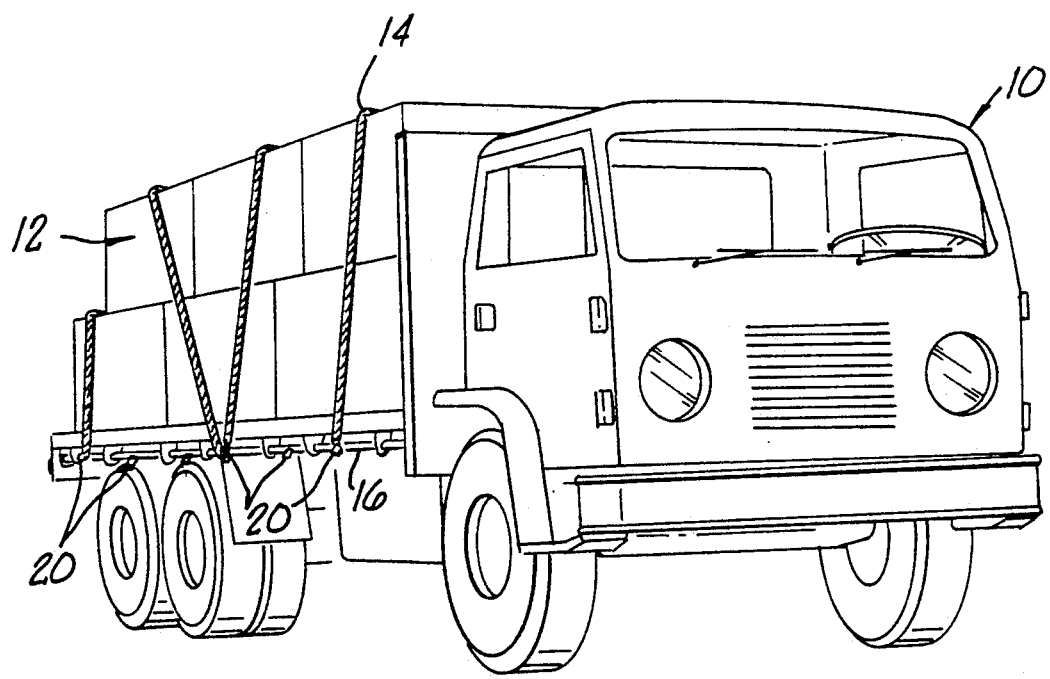
FIG. 2 is a perspective three quarter front view of a loaded flat bed truck showing the Quick Tie System.
Figure 5:
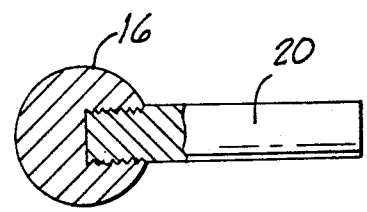
FIG. 5 is a sectional view of a binding peg and main shaft taken along line 5—5 in FIG. 3.

Turning in detail to the drawings, a flat bed vehicle 10 is carrying a load 12 in FIGS. 1 and 2. A single strand of rope 14 is used in the preferred embodiment to secure the load 12 to the vehicle 10. Main shafts 16 run longitudinally along both sides of the vehicle 10 and are rotatably supported by bearing supports 18 spaced along the length of each main shaft 16. The preferred location for the shafts 16 is immediately adjacent and below the outward edge of the truck bed, so as to be easily accessible, but not in the way. Each main shaft 16 has numerous protruding binding pegs 20 which do not hinder the rotation of the shafts 16. FIG. 5 illustrates how a binding peg 20 is attached to the main shaft 16 and shows how it could be removed from a main shaft 16.

To secure a load 12, the main shafts 16 are adjusted so that the binding pegs 20 extend outward horizontally. One end of a rope 14 is typically knotted with a double half hitch around one binding peg 20, usually near the end of the shaft 16. The balance of the rope 14 is laced over the load 12 and is looped around one or more intermediate binding pegs 20 until the end of the rope 14 is reached. Preferably, a single length of rope 14 will be sufficient to bind the entire load.

Figure 3:
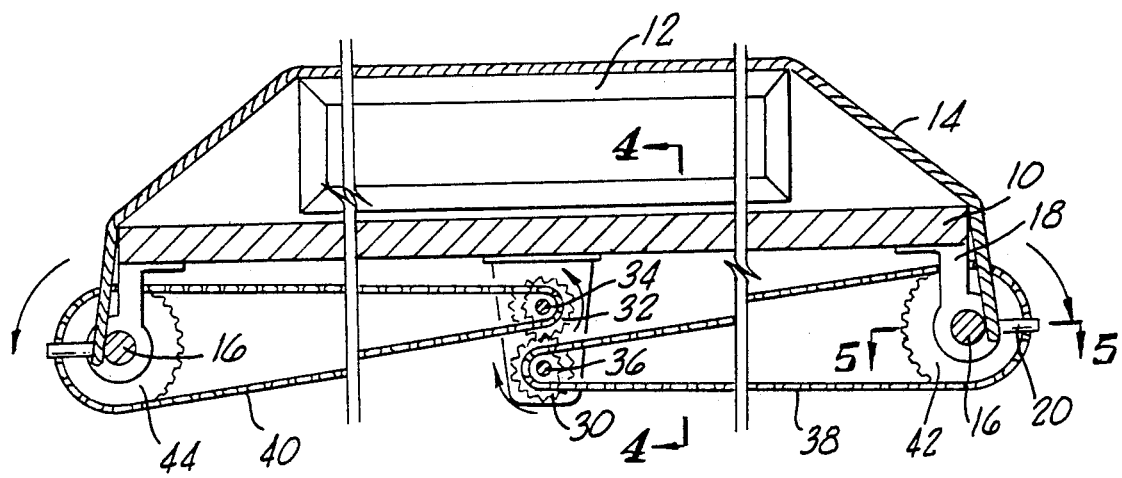
FIG. 3 is a sectional view taken along lines 3—3 in FIG. 1.
Figure 4:
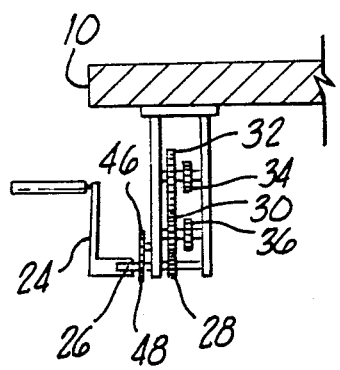
FIG. 4 is a sectional view taken along line 4—4 of FIG. 3.
Figure 6:
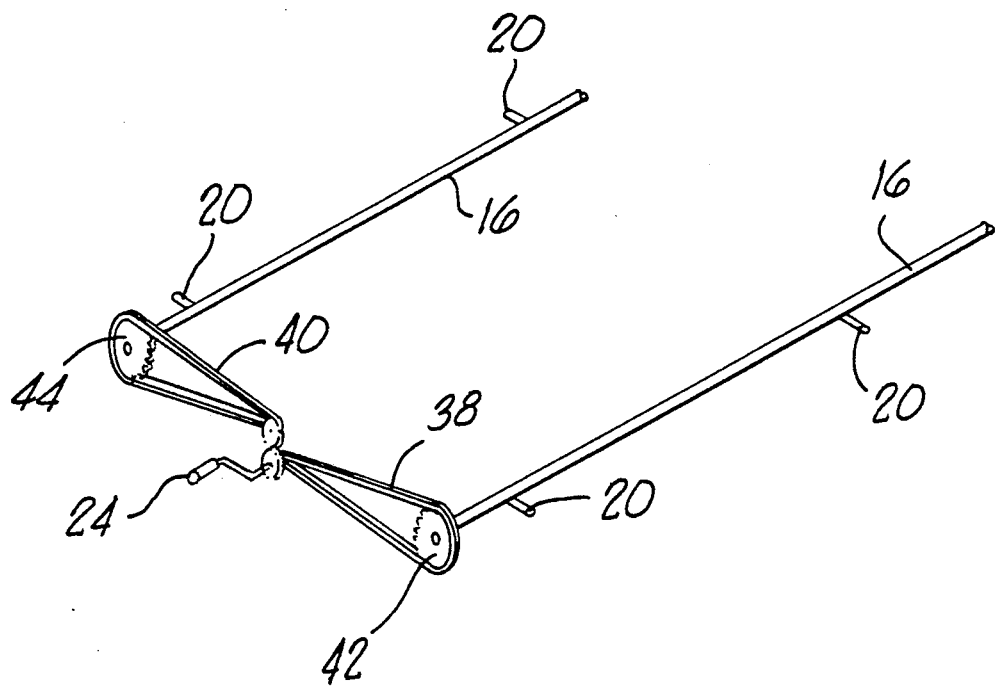
FIG. 6 is an isometric view of an embodiment of the present invention.

The gear box 22 is mounted at the lower rear of the vehicle 10 as shown in FIGS. 1, 3 and 4. This gear box 22 may be operated by utilizing a removable hand crank 24. The hand crank 24 is attached to an input shaft 26 having an input gear 28 coupled to a first directional gear 30 and a second directional gear 32 as shown in FIGS. 3 and 4. The directional gears 30 and 32 provide their respective output sprockets 34 and 36 with counter-rotating motion. Two drive means 38 and 40, preferably drive chains, couple the output sprockets 34 and 36 to the appropriate main shaft gears 42 and 44 mounted to the respective main shafts 16, transmitting the counter-rotating motion to the main shafts 16 and thereby actuate both main shafts 16. FIGS. 1 and 2 illustrate the location of the main shafts 16 and the binding pegs 20 with respect to the load 12 and do not illustrate the drive means 38 and 40 and the main shaft gears 42 and 44 which are illustrated in FIGS. 3 and 6.

As the hand crank 24 of gear box 20 is operated, the main shafts 16 rotate in opposite directions as indicated in FIG. 3, wrapping the rope 14 around the main shafts 16 at each one of the binding pegs 20 used, including the binding pegs 20 positioned between those at the distal ends of the main shafts 16, which may be referred to as intermediate binding pegs 20. This is illustrated in FIGS. 1 and 2. FIG. 6 illustrates another embodiment which does not utilize intermediate binding pegs 20 but only binding pegs 20 on the respective ends of the main shafts 16. The effect is to evenly pull the load 12 from each side and uniformly secure it to the vehicle 10. In the preferred embodiment, a common one way rachet lock 46 may engage in external gear 48 to secure the desired position of the Quick Tie System.

Thus, a load binding system is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

I claim:

1. A quick tie load binding system for a flat bed vehicle comprising:
   (a) two rotatable main shafts attached to the vehicle and extending along opposite sides of the load, each shaft comprising multiple binding pegs for the attachment of a binding;
   (b) a single gear box located between said two rotatable main shafts; and
   (c) drive means connecting said gearbox to said two rotatable main shafts,
   whereby actuation of said gear box and hence said drive means simultaneously drives said two rotatable main shafts in opposite directions to pull the binding tight across the load.

2. The quick tie load binding system of claim 1 wherein said gear box is actuated by a hand crank.

3. The quick tie load binding system of claim 1 wherein said gear box is centrally located between said two rotatable shafts.

4. The quick tie load binding system of claim 1 wherein said shafts are attached to said vehicle underneath and adjacent to the outside edge of the bed of the vehicle.

5. The quick tie load binding system of claim 1 wherein the entire load may be released simultaneously from a single point.

6. The quick tie load binding system of claim 1 wherein said binding is comprised of a single length of material to bind the load.

7. The quick tie load binding system of claim 1 wherein the binding is first attached at a distal end of one main shaft and successively looped across the load and around one or more intermediate binding pegs on each of the main shafts respectively, with said binding finally secured to another distal end of said one main shaft.

8. The quick tie load binding system of claim 7 wherein said binding is a rope.

9. The quick tie load binding system of claim 7 wherein said binding is a strap.

10. A method for securing a load to a flat bed truck comprising the steps of:
   (a) securely attaching one end of a length of a binding to one of a plurality of rotatable main shafts attached to the truck on respective sides thereof and extending along opposite sides of the load;
   (b) stringing the binding back and forth over the load to be secured by that length of the binding, the binding successively being looped around binding pegs on the shafts;
   (c) securely attaching the binding to said one main shaft at the other end of the binding's useful length; and
   (d) pulling the binding tight across the load by actuating a single gear box located between the shafts and connected to the shafts by drive means and thereby simultaneously rotating the main shafts in opposite directions.

* * * * *

UNITED STATES PATENT AND TRADEMARK OFFICE
CERTIFICATE OF CORRECTION

PATENT NO. : 5,118,232

DATED : June 2, 1992

INVENTOR(S) : Cary W. Shuker

It is certified that error appears in the above-identified patent and that said Letters Patent is hereby corrected as shown below:

Column 1, line 38, change "form" to -- from --.

Signed and Sealed this

First Day of February, 1994

*Attest:*

BRUCE LEHMAN

*Attesting Officer*      *Commissioner of Patents and Trademarks*